US012025209B2

(12) United States Patent
McBurney (10) Patent No.: US 12,025,209 B2
(45) Date of Patent: Jul. 2, 2024

(54) INTERLOCKING STATOR ASSEMBLY AND TORQUE CONVERTER INCLUDING AN INTERLOCKING STATOR ASSEMBLY

(71) Applicant: Schaeffler Technologies AG & Co. KG, Herzogenaurach (DE)

(72) Inventor: Craig McBurney, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 451 days.

(21) Appl. No.: 17/480,226

(22) Filed: Sep. 21, 2021

(65) Prior Publication Data

US 2023/0091289 A1 Mar. 23, 2023

(51) Int. Cl.
*F16H 41/24* (2006.01)
(52) U.S. Cl.
CPC ....... *F16H 41/24* (2013.01); *F16H 2041/246* (2013.01)
(58) Field of Classification Search
CPC .................................................. F16H 2041/246
See application file for complete search history.

(56) References Cited

U.S. PATENT DOCUMENTS

| 8,899,032 B2* | 12/2014 | Brees ................. F16D 41/067 60/362 |
| 9,903,455 B2* | 2/2018 | Dattawadkar ........... F16H 45/02 |
| 10,309,508 B2* | 6/2019 | Matsuda ................. F16H 41/24 |
| 10,598,212 B2 | 3/2020 | Lewis et al. |
| 10,895,310 B2 | 1/2021 | Souers et al. |
| 2009/0205916 A1 | 8/2009 | Peri |

* cited by examiner

*Primary Examiner* — Michael Leslie
(74) *Attorney, Agent, or Firm* — Volpe Koenig (57) ABSTRACT

A torque converter, including: a cover arranged to receive torque and supported for rotation around an axis of rotation; an impeller including an impeller shell connected to the cover and at least one impeder blade; a turbine in fluid communication with the impeller and including a turbine shell and at least one turbine blade; and a stator assembly including a stator including a plurality of stator blades, a side plate including a radially outer surface defining a slot, a one-way clutch axially disposed between the stator and the side plate, and a washer including an annular body portion in contact with the side plate, and an axial protrusion extending past the annular body portion in a first axial direction parallel to the axis of rotation, and disposed in the slot.

20 Claims, 9 Drawing Sheets

INTERLOCKING STATOR ASSEMBLY AND TORQUE CONVERTER INCLUDING AN INTERLOCKING STATOR ASSEMBLY

TECHNICAL FIELD

The present disclosure relates to a stator assembly, for a torque converter, including an interlocking side plate and washer and a torque converter including the stator with the interlocking side plate and washer.

BACKGROUND

Known stator assemblies for a torque converter include: side plates used to axially retain components of the stator assembly; and thrust washers. During operation of the torque converter, drag forces act on the side plate to rotate the side plate with respect to other components of the stator assembly, which can result in axial displacement of the side plate and thrust washer, and failure of the stator assembly.

SUMMARY

According to aspects illustrated herein, there is provided a stator assembly for a torque converter, including: a stator supported for rotation around an axis of rotation and including a plurality of stator blades; a side plate in contact with the one-way clutch and including a radially outer surface defining a slot; a one-way clutch axially disposed between the stator and the side plate; and a washer including an annular body portion in contact with the side plate and an axial protrusion extending, in a first axial direction parallel to the axis of rotation, past the annular body portion, and disposed in the slot.

According to aspects illustrated herein, there is provided a torque converter, including: a cover arranged to receive torque and supported for rotation around an axis of rotation; an impeller including an impeller shell connected to the cover and at least one impeller blade; a turbine in fluid communication with the impeller and including a turbine shell and at least one turbine blade; and a stator assembly including a stator including a plurality of stator blades, a side plate including a radially outer surface defining a slot, a one-way clutch axially disposed between the stator and the side plate, and a washer including an annular body portion in contact with the side plate, and an axial protrusion extending past the annular body portion in a first axial direction parallel to the axis of rotation, and disposed in the slot.

According to aspects illustrated herein, there is provided a method of limiting rotation of a side plate in a stator assembly of a torque converter during operation of the torque converter, the stator assembly including a stator supported for rotation around an axis of rotation and including a plurality of stator blades, a side plate defining a slot, a one-way clutch axially disposed between the stator and the side plate, and a washer including an annular body portion and an axial protrusion extending past the annular body portion in a first axial direction parallel to the axis of rotation, passing through the slot and including a distal end disposed in a recess defined by the stator. The method includes: rotating the stator in a first circumferential direction around the axis of rotation; contacting, with a first surface of the side plate, a first surface of the axial protrusion facing in the first circumferential direction; contacting a surface of the stator, defining a recess in the stator, with a second surface of the axial protrusion facing in a second circumferential direction, opposite the first circumferential direction; urging, with a drag force, the side plate in the second circumferential direction; and blocking, with the axial protrusion and the stator, rotation of the side plate, with respect to the stator, in the second circumferential direction.

BRIEF DESCRIPTION OF THE DRAWINGS

Various embodiments are disclosed, by way of example only with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
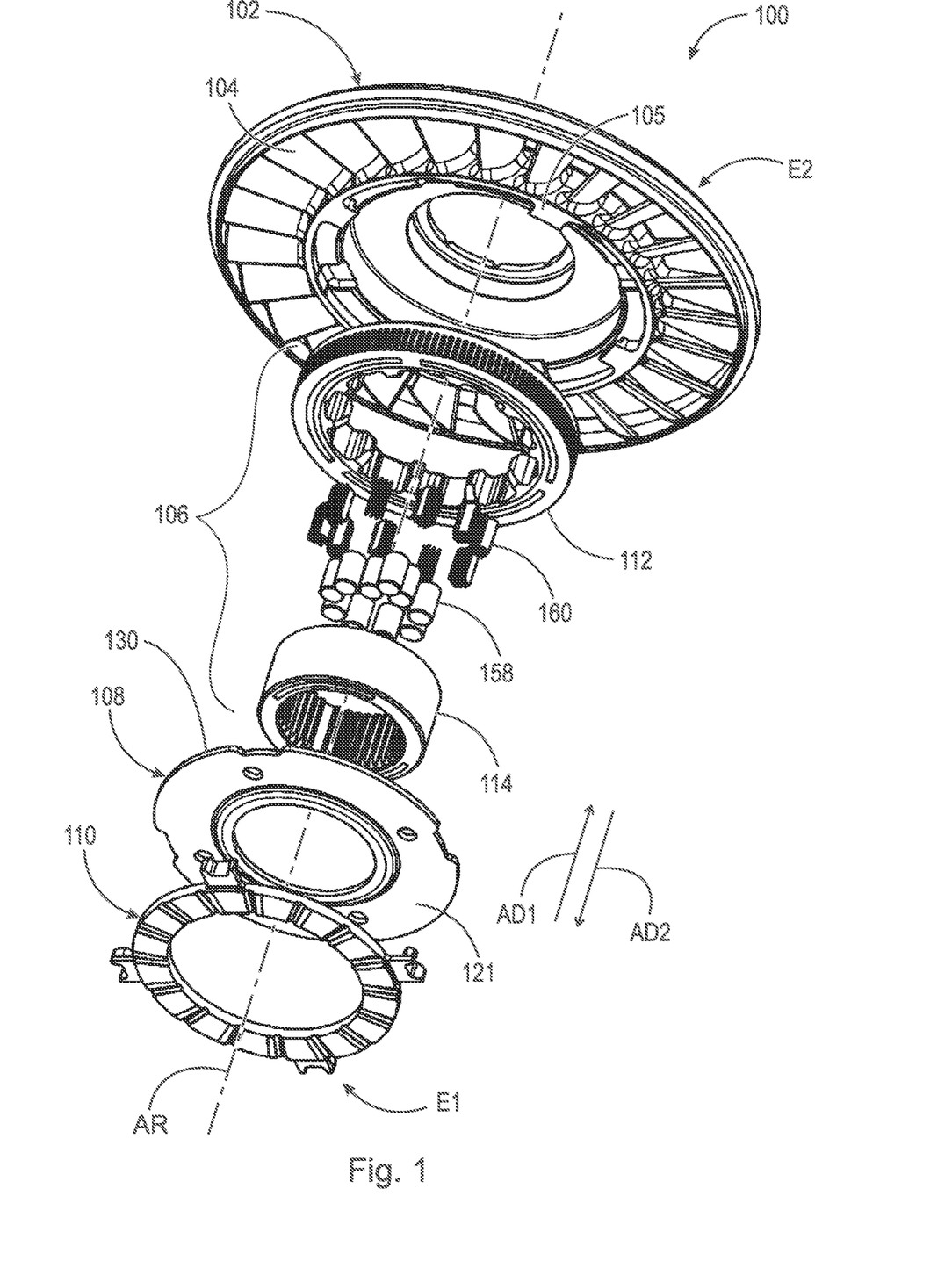
FIG. 1 is an exploded view of an interlocking stator assembly for a torque converter.

FIG. 1 is an exploded view of interlocking stator assembly 100 for a torque converter.

Figure 2:
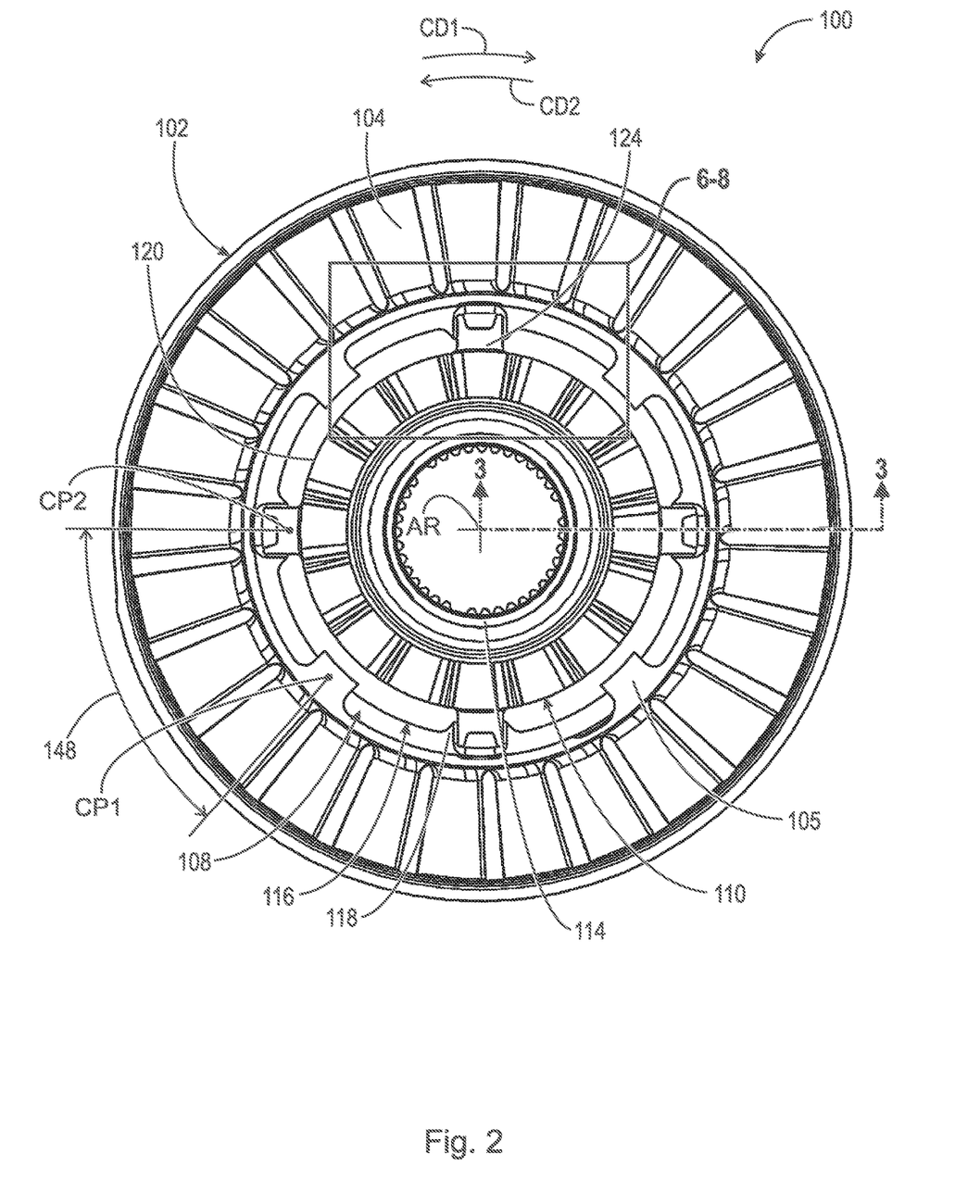
FIG. 2 is a front view of the interlocking stator assembly shown in FIG. 1.

FIG. 2 is a front view of interlocking stator assembly 100 shown in FIG. 1.

Figure 3:
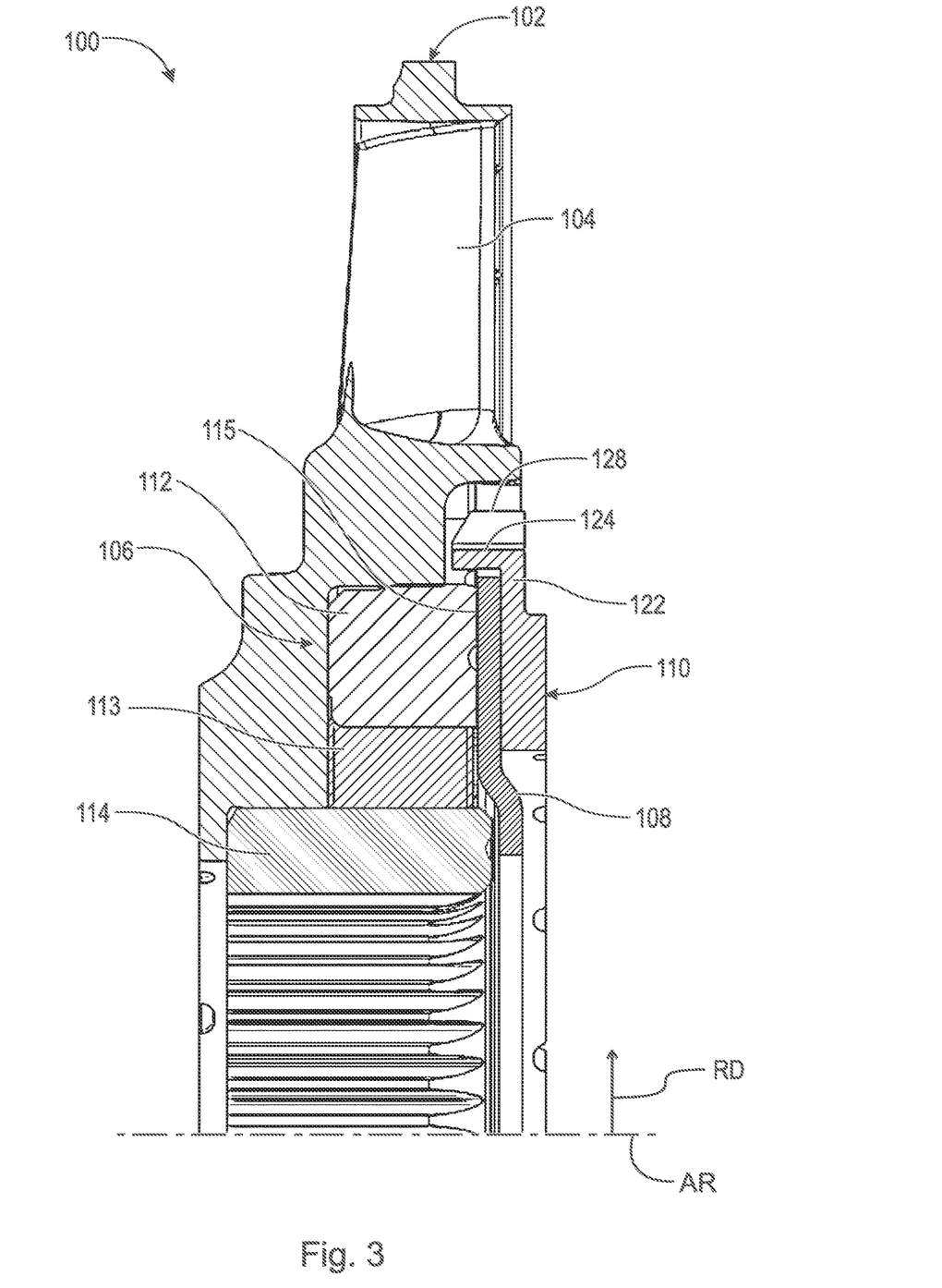
FIG. 3 is a cross-section generally along line 3-3 in FIG. 2.

FIG. 3 is a cross-section generally along line 3-3 in FIG. 2. The following should be viewed in light of FIGS. 1 through 3. Stator assembly 100 includes: stator 102 supported for rotation around axis of rotation AR and including stator blades 104 and tabs 105; one-way clutch 106; side plate 108; and washer 110. Clutch 106 includes outer race 112 non-rotatably connected stator; rollers 113; and inner race 114 arranged to non-rotatably connect to a stator shaft (now shown). Side plate 108 is in contact with one-way clutch 106, for example surface 115 of side plate 108, facing in axial direction AD1 parallel to axis AR, is in contact with outer race 112. Side plate 108 includes radially outer surface 116 defining slots 118. In the example of FIG. 1, washer 110 is a hydrodynamic washer. Tabs 105 axially retain side plate 108. Washer 110 forms axial end E1 of assembly 100 and stator 102 forms axial end E2 of assembly 100. It is understood that stator assembly 100 is not limited to a roller one-way clutch and that other one-way clutches, including, but not limited to a sprag one-way clutch can be used in stator 100.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 4:
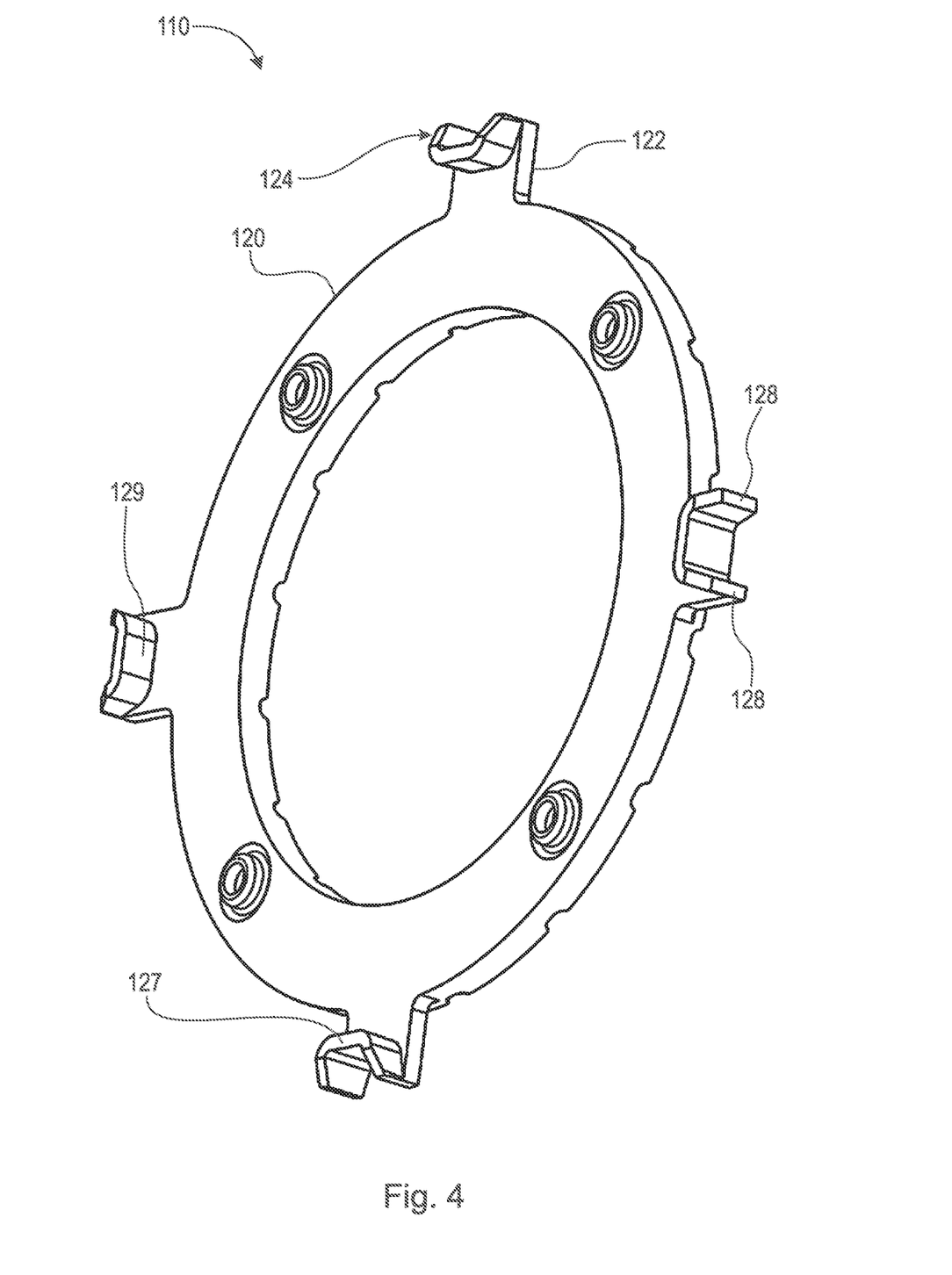
FIG. 4 is a back isometric view of a washer shown in FIG. 1.

FIG. 4 is a back isometric view of washer 110 shown in FIG. 1. The following should be viewed in light of FIGS. 1 through 4. Washer 110 includes: annular body portion 120 in contact with surface 121 of side plate 108 facing in axial direction AD2, opposite direction AD1; radial protrusions 122 extending radially outwardly from body portion 120; and axial protrusions 124. Axial protrusions 124 extend, in axial direction AD1 past annular body portion 120, and are disposed in slots 118. Axial protrusions 124 extend past side plate 108 in axial direction AD1. In the example of FIG. 1, radial protrusions 122 are in contact surface 121.

Figure 5:
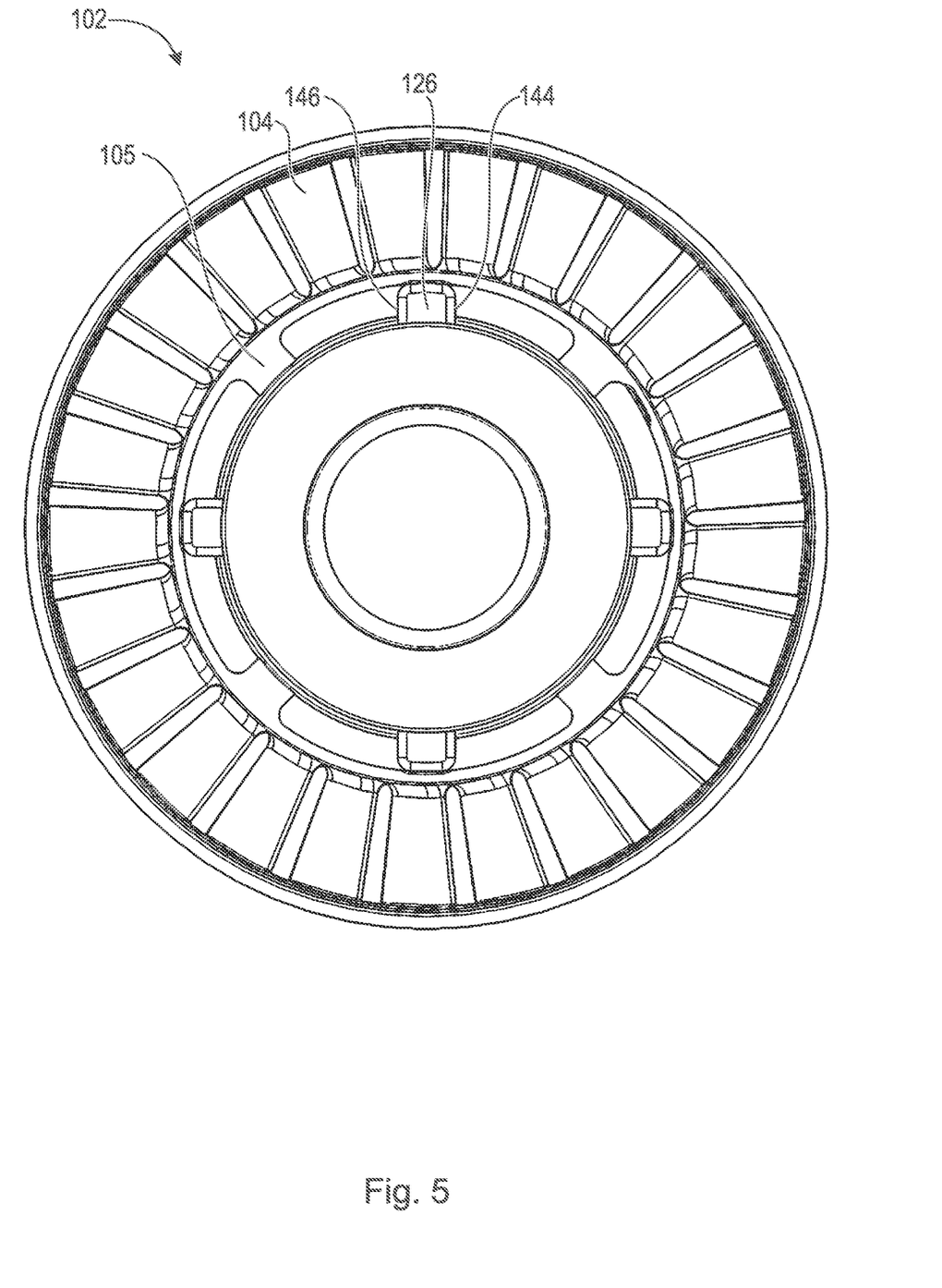
FIG. 5 is a front view of a stator shown in FIG. 1.

FIG. 5 is a front view of stator 102 shown in FIG. 1. The following should be viewed in light of FIGS. 1 through 5. Stator 102 defines recesses 126. Axial protrusions 124 include distal ends 127 disposed in recesses 126.

Figure 6:
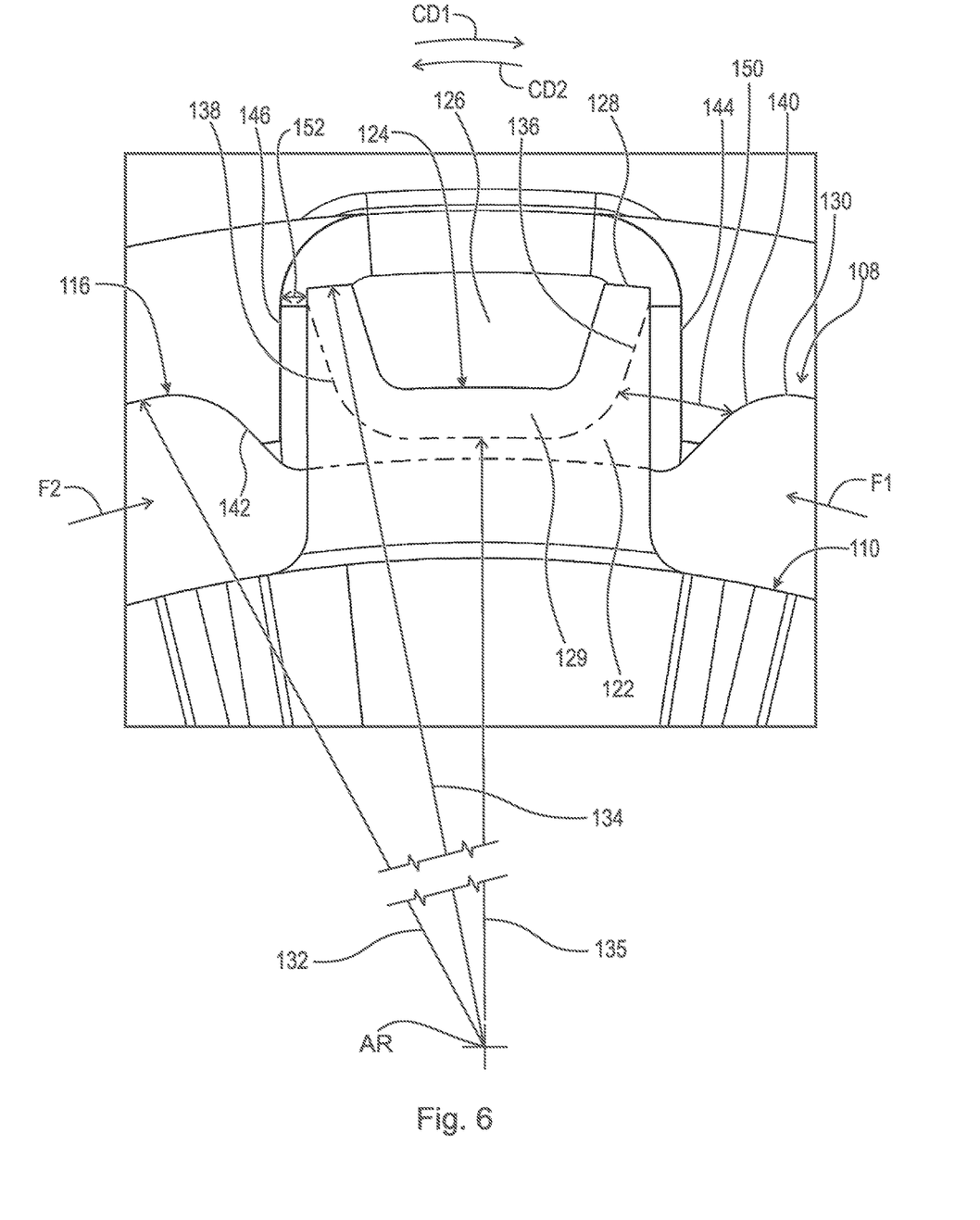
FIG. 6 is a detail of area 6-8 in FIG. 2.

FIG. 6 is a detail of area 6-8 in FIG. 2, The following should be viewed in light of FIGS. 1 through 6. Axial protrusions 124 include radially outermost portions 128 and radially innermost portions 129. Radially outer surface 116 includes radially outermost portions 130. In the example of FIG. 1, portions 130 are at distance 132, in radial direction RD, from axis AR; and portions 128 are at distance 134, greater than distance 132, in direction RD, from axis AR. In the example of FIG. 1, at least segments of portions 129 are located at distance 135 in direction RD, less than distance 132, from axis AR. In an example embodiment, not shown, distance 134 is less than or equal to distance 132.

Axial protrusions 124 include: surfaces 136 facing at least partly in circumferential direction CD1 around axis of rotation AR; and surfaces 138 facing at least partly in circumferential direction CD2, opposite direction CD1. Side plate 108 includes: surfaces 140 defining slots 118 in circumferential direction CD1; and surfaces 142 defining slots 118 circumferential direction CD2. Stator 102 includes: surfaces 144 defining recesses 126 in circumferential direction CD1; and surfaces 146 defining recesses 126 circumferential direction CD2.

An extent of a rotation of side plate 108, with respect to stator 102, in directions CD1 and CD2 is limited by the configuration of axial protrusions 124 in slots 118 and in recesses 126. As noted above, tabs 105 retain side plate 108 in axial direction AD2. The extent of rotation is limited to prevent slots 118 from axially aligning with tabs 105, which alignment would enable side plate 108 to displace, with respect to stator 102, in direction AD2.

Assembly 100 is not limited to a particular circumferential configuration of side plate 108 and washer 110 with respect to each other, or to a particular circumferential configuration of side plate 108 and/or washer 110 with respect to stator 102. However, as further described below, in all configurations of assembly 100, axial alignment of slots 118 with tabs 105 is blocked.

In the discussion that follows, rotation of side plate 108 and washer 110 is with respect to stator 102 unless stated otherwise. In the example configuration of FIG. 6, protrusion 124 is substantially circumferentially centered with respect to slot 118 and recess 126. Surface 136 is free of contact with surface 144 and surface 140. Surface 138 is free of contact with surface 146 and surface 142. Rotation of side plate 108 in directions CD1 and CD2 due to drag forces is possible, as further described below. In general, to axially align slots 118 with tabs 105 from the configuration of FIG. 6, which is not possible for stator assembly 100, side plate 108 would need to rotate by distance 148 in direction CD1 or CD2 with respect to washer 110. Distance 148 is the distance in direction CD1 or CD2 between circumferential center point CP1 of a tab 105 and circumferential center point CP2 of a circumferentially closest radial protrusion 122.

In the example of FIG. 6: assume stator 102 is rotating in direction CD1, and drag force F1 in direction CD2 on side plate 108 is sufficient to rotate side plate 108 by distance 150 in direction CD2 to contact surface 140 with surface 136 of protrusion 124; and the combination of side plate 108 and washer 110 is further rotated, by drag force F1, in direction CD2 by distance 152, so that surface 138 of protrusion 124 contacts surface 146 of stator 102, When surface 138 of protrusion 124 contacts surface 146, further rotation of side plate 108 and washer 110 in direction CD2 is blocked. The combination of distances 150 and 152 is less than distance 148 in direction CD2; therefore, alignment of slots 118 with tabs 105 is not possible. The preceding discussion is applicable to assembly 100 with stator 102 rotating in direction CD2, and drag force F2 in direction CD1.

Figure 7:
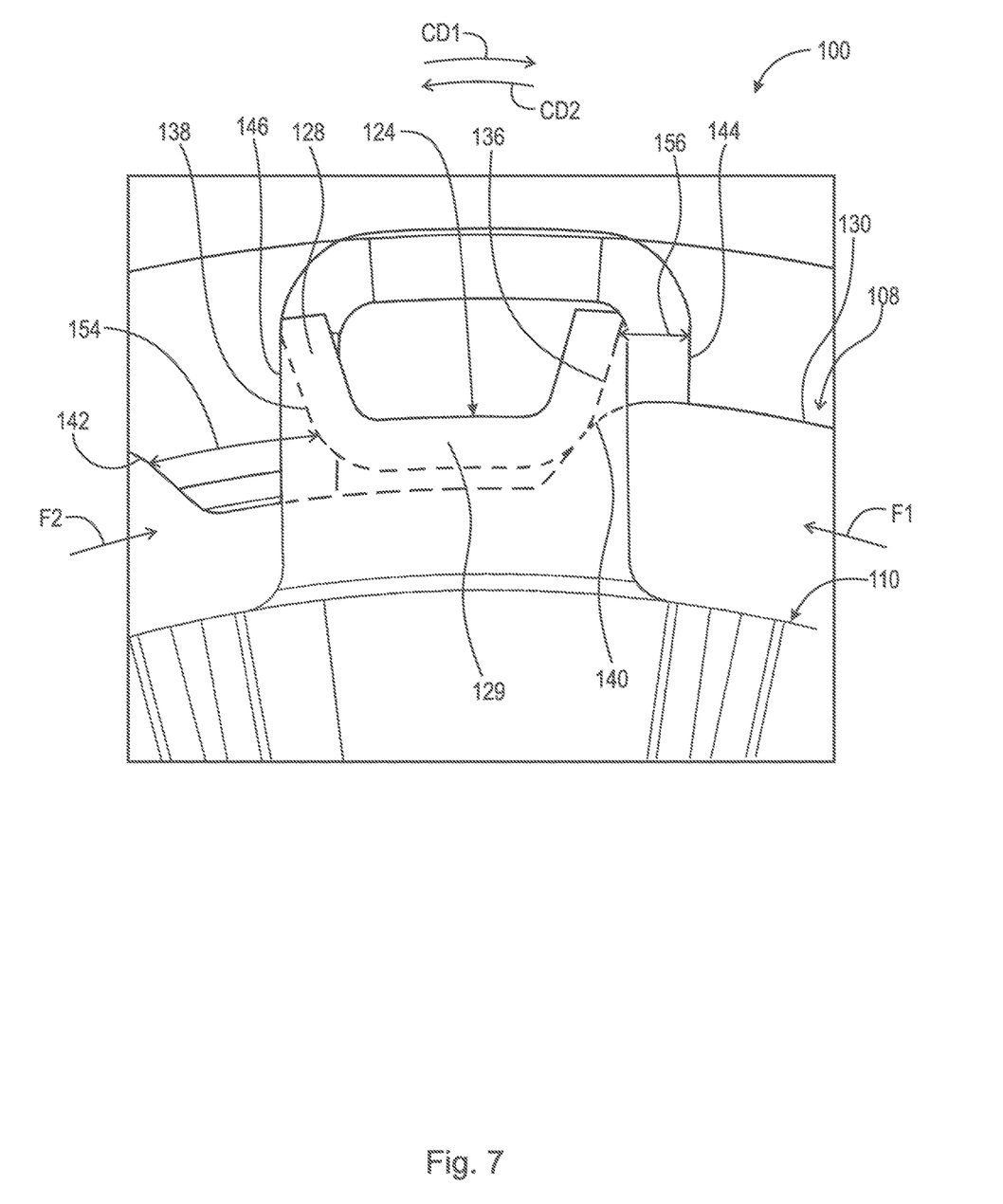
FIG. 7 is a detail of area 6-8 in FIG. 2.

FIG. 7 is a detail of area 6-8 in FIG. 2. The following should be viewed in light of FIGS. 1 through 7. In the example configuration of FIG. 7: surface 136 is free of contact with surface 144, and is in contact with surface 140; and surface 138 is in contact with surface 146, and is free of contact with surface 142. FIG. 7 illustrates a largest extent of rotation of side plate 108, in this case in direction CD1, for the configuration of assembly 100 shown in FIG. 1.

In the example of FIG. 7, assume stator 102 is rotating in direction CD2 and drag force F2 in direction CD1 on side plate 108 is sufficient to rotate side plate 108 by distance 154 in direction CD1 to contact surface 142 with surface 138, and that the combination of side plate 108 and washer 110 is further rotated by drag force F2 in direction CD1 by distance 156, so that surface 136 contacts surface 144. When surface 136 contacts surface 144, further rotation of side plate 108 and washer 110 in direction CD1 is blocked. The combination of distances 154 and 156 is less than distance 148 in direction CD1; therefore, alignment of slots 118 with tabs 105 is not possible. The preceding discussion is applicable to assembly 100 with a circumferential reversal of surfaces and directions. For example, starting with: surface 138 in contact with surface 142; surface 136 in contact with surface 144; stator 102 rotating in direction CD1; and drag force F1 in direction CD2.

Figure 8:
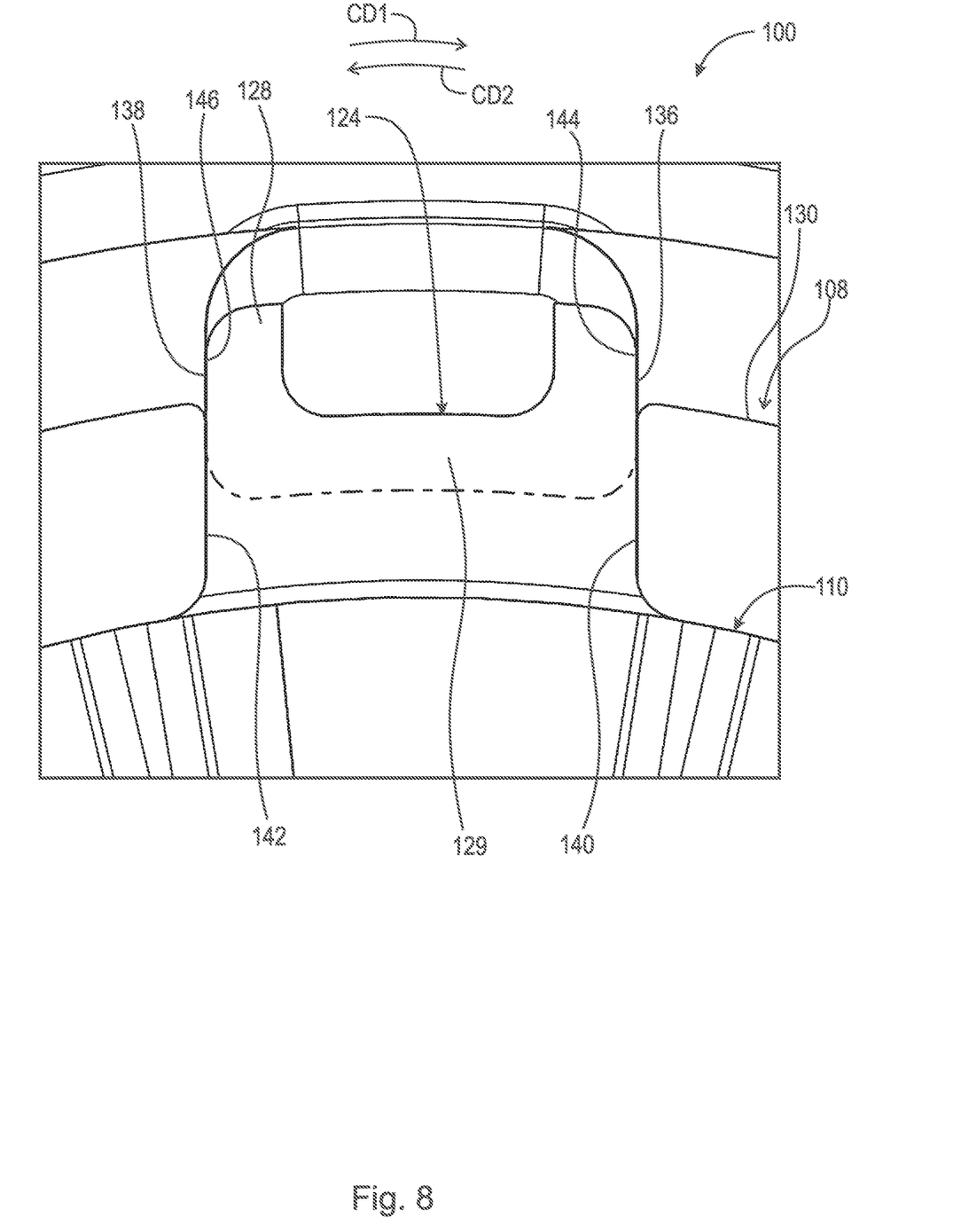
FIG. 8 is a detail of area 6-89 in FIG. 2.

FIG. 8 is a detail of area 7-9 in FIG. 2. In FIG. 8: surface 136 is in contact with surfaces 140 and 144; and surface 138 is in contact with surfaces 142 and 146. In FIG. 8, rotation of side plate 108 and washer 110, in direction CD1 or in direction CD2 is blocked. Therefore, alignment of slots 118 with tabs 105 is not possible.

It is understood that stator assembly 100 is not limited to the circumferential configurations shown in FIGS. 1 through 7 and that other circumferential configurations of side plate 108 and washer 110 are possible.

In the example of FIG. 1, one-way clutch 106 is a roller one-way clutch including rollers 158 and springs 160. It is understood that stator assembly is not limited to a roller one-way clutch and that other one-way clutch configurations, including but not limited to sprag one-way clutches, are possible.

The novel configuration of washer 110, in particular radial protrusions 122 and axial protrusions 124, enable washer 110 to perform both a thrust bearing function and a side plate retention function without adding to the parts count of stator assembly 100. Thus, the cost, complexity, and footprint of assembly 100 are minimized, and manufacturability of assembly 100 is improved.

Figure 9:
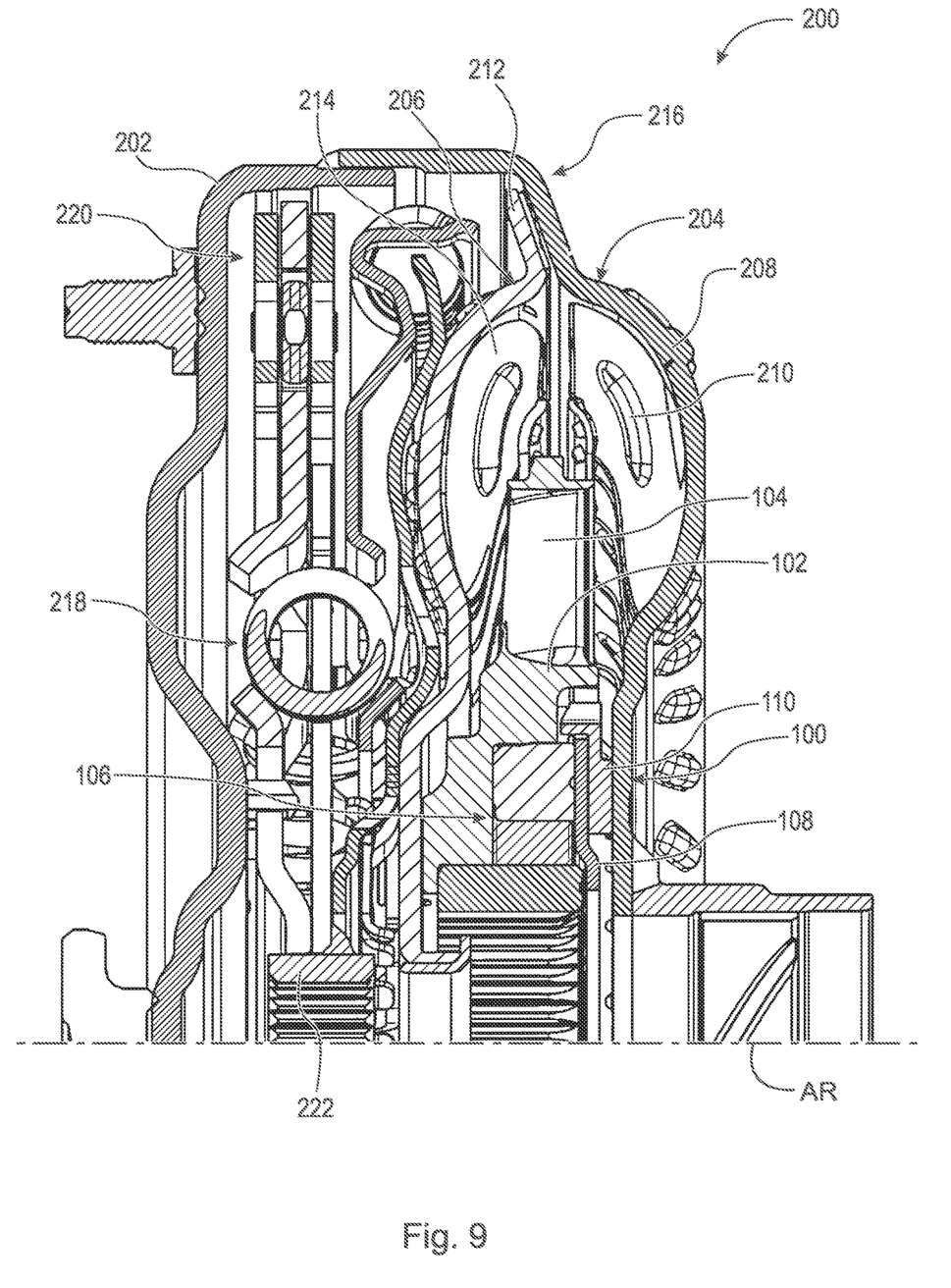
FIG. 9 is a partial cross-sectional view of a torque converter with the stator assembly shown in FIG. 1.

FIG. 9 is a partial cross-sectional view of torque converter 200 with stator assembly 100 shown in FIG. 1. The following should be viewed in light of FIGS. 1 through 9. Torque converter 200 includes: stator assembly 100; cover 202 arranged to receive rotational torque; impeller 204 non-rotatably connected to cover 202; and turbine 206 in hydraulic communication with impeller 204. Impeller 204 includes impeller shell 208 and at least one impeller blade 210. Turbine 206 includes turbine shell 212 and at least one turbine blade 214. In the example of FIG. 9, torque converter 200 includes: turbine lock-up clutch 216; vibration damper 218; pendulum vibration absorber 220; and output hub 222 arranged to non-rotatably connect to a transmission input shaft (not shown).

It is understood that: stator assembly 100 is not limited to inclusion in the configuration of torque converter 200; stator assembly 100 is not limited to use in a particular torque converter configuration; and that stator assembly 100 can be used in other configurations of torque converters. For example, stator assembly 100 can be used in torque converter configurations including different types of lock-up clutches or different types of vibration damping and/or absorbing.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
CP1 circumferential center point, tab
CP2 circumferential center point, radial protrusion
E1 axial end
E2 axial end
100 stator assembly
102 stator
104 stator blade
105 tab, stator
106 one-way clutch
108 side plate
110 washer
112 outer race
114 inner race
115 surface, side plate
116 radially outer surface, side plate
118 slot, side plate
120 annular body portion, washer
121 surface, side plate
122 radial protrusion, washer
124 axial protrusion, washer
126 recess, stator
127 distal end
128 portion, washer
129 portion, washer
130 portion, side plate
132 radial distance
134 radial distance
135 radial distance
136 surface, washer
138 surface, washer
140 surface, side plate
142 surface, side plate
144 surface, stator
146 surface, stator
148 circumferential distance
150 circumferential distance
152 circumferential distance
154 circumferential distance
156 circumferential distance
158 roller
160 spring
200 torque converter
202 cover
204 impeller
206 turbine
208 impeller shell
210 impeller blade
212 turbine shell
214 turbine blade
216 turbine lock-up clutch
218 vibration damper
220 pendulum vibration absorber
222 output hub

The invention claimed is:

1. A stator assembly for a torque converter, comprising:
a stator supported for rotation around an axis of rotation and including a plurality of stator blades;
a side plate including a radially outer surface defining a slot, the slot being radially inward of the radially outer surface;
a one-way clutch axially disposed between the stator and the side plate; and,
a washer including:
an annular body portion in contact with the side plate; and,
an axial protrusion extending, in a first axial direction parallel to the axis of rotation, past the annular body portion, and disposed in the slot.

2. The stator assembly of claim 1, wherein the axial protrusion extends past the side plate in the first axial direction.

3. The stator assembly of claim 1, wherein:
the stator defines a recess; and,
the axial protrusion includes a distal end disposed in the recess.

4. The stator assembly of claim 1, wherein the washer includes a portion located further, in a radial direction orthogonal to the axis of rotation, from the axis of rotation than a radially outermost portion of the radially outer surface of the side plate.

5. The stator assembly of claim 1, wherein the axial protrusion includes a portion located further, in a radial direction orthogonal to the axis of rotation, from the axis of rotation than a radially outermost portion of the radially outer surface of the side plate.

6. The stator assembly of claim 1, wherein the axial protrusion includes:
a first portion located further, in a radial direction orthogonal to the axis of rotation, from the axis of rotation than a radially outermost portion of the radially outer surface of the side plate; and,
a second portion located closer, in the radial direction, to the axis of rotation than the radially outermost portion of the radially outer surface of the side plate.

7. The stator assembly of claim 1, wherein:
the washer includes a plurality of radial protrusions extending radially outwardly from the annular body portion; and,
the axial protrusion extends from a radial protrusion included in the plurality of radial protrusions.

8. The stator assembly of claim 7, wherein the plurality of radial protrusions is in contact with the side plate.

9. The stator assembly of claim 1, wherein:
the axial protrusion includes a surface facing at least partly in a circumferential direction around the axis of rotation; and,
the surface is in contact with the stator; or,
the surface is in contact with the side plate.

10. The stator assembly of claim 1, wherein:
the axial protrusion includes a surface facing at least partly in a circumferential direction around the axis of rotation; and,
the surface is free of contact with the stator; or,
the surface is free of contact with the side plate.

11. The stator assembly of claim 1, wherein:
the axial protrusion includes:
a first surface facing at least partly in a first circumferential direction around the axis of rotation; and,
a second surface facing at least partly in a second circumferential direction, opposite the first circumferential direction;
the side plate includes a third surface:
defining the slot in the first circumferential direction; and,
in contact with the first surface; and,
the stator includes a fourth surface:
defining a recess in the second circumferential direction; and,
in contact with the second surface.

12. A torque converter, comprising:
a cover arranged to receive torque and supported for rotation around an axis of rotation;
an impeller including:
an impeller shell connected to the cover; and,
at least one impeller blade;
a turbine in fluid communication with the impeller and including:
a turbine shell; and,
at least one turbine blade; and,
a stator assembly including:
a stator including a plurality of stator blades;
a side plate including a radially outer surface defining a slot;
a one-way clutch axially disposed between the stator and the side plate; and,
a washer including:
an annular body portion in contact with the side plate; and,
an axial protrusion extending past the annular body portion in a first axial direction parallel to the axis of rotation, the axial protrusion including a surface facing at least partly in a circumferential direction around the axis of rotation, and the surface is in contact with the stator or the side plate.

13. The torque converter of claim 12, wherein:
the stator defines a recess; and,
the axial protrusion includes a distal end disposed in the recess.

14. The torque converter of claim 12, wherein the axial protrusion includes:
a first portion located further, in a radial direction orthogonal to the axis of rotation, from the axis of rotation than a radially outermost portion of the radially outer surface of the side plate; and,
a second portion located closer, in the radial direction to the axis of rotation than the radially outermost portion of the radially outer surface of the side plate.

15. The torque converter of claim 12, wherein:
the washer includes a plurality of radial protrusions extending radially outwardly from the annular body portion; and,
the axial protrusion extends from a radial protrusion included in the plurality of radial protrusions.

16. The torque converter of claim 12, wherein the axial protrusion includes:
a first surface:
facing at least partly in a first circumferential direction around the axis of rotation;
in contact with the stator; and,
free of contact with the side plate; and,
a second surface:
facing at least partly in a second circumferential direction, opposite the first circumferential direction;
in contact with the stator; and,
free of contact with the side plate.

17. A method of limiting rotation of a side plate in a stator assembly of a torque converter during operation of the torque converter, the stator assembly including a stator supported for rotation around an axis of rotation and including a plurality of stator blades, a side plate defining a slot, a one-way clutch axially disposed between the stator and the side plate, and a washer including an annular body portion and an axial protrusion extending past the annular body portion in a first axial direction parallel to the axis of rotation, passing through the slot, and including a distal end disposed in a recess defined by the stator, the method comprising:
rotating the stator in a first circumferential direction around the axis of rotation;
contacting with a first surface of the side plate, a first surface of the axial protrusion facing in the first circumferential direction;

contacting a surface of the stator, defining a recess in the stator, with a second surface of the axial protrusion facing in a second circumferential direction, opposite the first circumferential direction;

urging, with a drag force, the side plate in the second circumferential direction; and, blocking, with the axial protrusion and the stator, rotation of the side plate, with respect to the stator, in the second circumferential direction.

18. The method of claim 17, further comprising:

prior to urging, with the drag force, the side plate in the second circumferential direction:

rotating the stator in the first circumferential direction and with the first surface of the axial protrusion out of contact with the first surface of the side plate; and,    rotating, with the drag force and with respect to the stator, the side plate in the second circumferential direction until the first surface of the side plate contacts the first surface of the axial protrusion.

19. The method of claim 17, further comprising:

prior to urging, with the drag force, the side plate in the first circumferential direction:

rotating the stator in the first circumferential direction and with the second surface of the axial protrusion out of contact with a surface of the stator defining the recess in the second circumferential direction; and,    rotating, with the drag force and with respect to the stator, the washer in the second circumferential direction until the second surface of the axial protrusion contacts the surface of the stator defining the recess in the second circumferential direction.

20. The method of claim 17, further comprising:

prior to urging, with the drag force, the side plate in the second circumferential direction:

rotating the stator in the first circumferential direction and with:

the first surface of the axial protrusion out of contact with the first surface of the side plate; and,      the second surface of the axial protrusion out of contact with a surface of the stator defining the recess in the second circumferential direction;

rotating, with the drag force and with respect to the stator, the side plate in the second circumferential direction until the first surface of the side plate contacts the first surface of the axial protrusion; and    rotating, with the drag force and with respect to the stator, the side plate and the washer in the second circumferential direction until the second surface of the axial protrusion contacts the surface of the stator defining the recess in the second circumferential direction.

\* \* \* \* \*